(12) United States Patent
Cole

(10) Patent No.: US 7,166,798 B2
(45) Date of Patent: Jan. 23, 2007

(54) SPRING-ACTIVATED IN-FLOOR FITTING

(75) Inventor: Michael T. Cole, Williamstown, WV (US)

(73) Assignee: Wiremold, Co., West Hartford, CT (US)

( * ) Notice: Subject to any disclaimer, the term of this patent is extended or adjusted under 35 U.S.C. 154(b) by 0 days.

(21) Appl. No.: 11/014,048

(22) Filed: Dec. 16, 2004

(65) Prior Publication Data

US 2005/0133234 A1 Jun. 23, 2005

Related U.S. Application Data

(60) Provisional application No. 60/532,188, filed on Dec. 23, 2003.

(51) Int. Cl.
*H02G 3/04* (2006.01)

(52) U.S. Cl. ........................... 174/48; 174/49; 439/650

(58) Field of Classification Search ................. 174/47, 174/48, 49, 54, 480, 481, 482, 483, 484, 174/490, 494; 439/650, 535, 652; 52/220.8, 52/220.5, 220.7

See application file for complete search history.

(56) References Cited

U.S. PATENT DOCUMENTS

| 1,518,733 | A | 12/1924 | Eckstein |
| 1,717,836 | A | 6/1929 | Conner |
| 3,975,075 | A | 8/1976 | Mason |
| 4,091,231 | A | 5/1978 | Sotolongo |
| 4,266,266 | A | 5/1981 | Sanner |
| 4,323,724 | A | 4/1982 | Shine |
| 4,336,416 | A | 6/1982 | Goodsell |
| 4,583,799 | A | 4/1986 | Wiley |
| 4,770,643 | A | 9/1988 | Castellani et al. |
| 4,827,080 | A | 5/1989 | Castellani et al. |
| 4,864,078 | A | 9/1989 | Bowman |
| 4,978,318 | A | 12/1990 | Wiley et al. |
| 4,993,970 | A | 2/1991 | Littrell |
| 5,030,795 | A | 7/1991 | Domigan |
| 5,124,876 | A | 6/1992 | Misencik et al. |
| 5,135,411 | A | 8/1992 | Wiley et al. |

(Continued)

FOREIGN PATENT DOCUMENTS

CA 2211066 4/1998

(Continued)

OTHER PUBLICATIONS

Hubbell Brochure entitled "Fire-Rated Poke-Through Flush Series"; dated 1989, no date.

(Continued)

*Primary Examiner*—Dhiru R. Patel
(74) *Attorney, Agent, or Firm*—McAndrews, Held & Malloy, Ltd.

(57) ABSTRACT

Embodiments of the present invention include an in-floor fitting. The in-floor fitting includes a trim ring and an internal housing. The internal housing includes at least one of an electrical and communication receptacle and is configured to be positioned in an open position in which the at least one of an electrical and communication receptacle is positioned above a surface of a floor, and a closed position in which the at least one of an electrical and communication receptacle is positioned below a surface of the floor.

20 Claims, 4 Drawing Sheets

U.S. PATENT DOCUMENTS

| | | | |
|---|---|---|---|
| 5,195,288 | A | 3/1993 | Penczak |
| 5,272,278 | A | 12/1993 | Wuertz |
| 5,362,922 | A | 11/1994 | Whitehead |
| 5,460,542 | A | 10/1995 | Castellani et al. |
| 5,467,565 | A | 11/1995 | Bowman et al. |
| 5,705,772 | A * | 1/1998 | Brown ................ 174/48 |
| 5,763,826 | A | 6/1998 | Castellani et al. |
| 5,814,764 | A | 9/1998 | Kohaut |
| 6,018,126 | A | 1/2000 | Castellani et al. |
| 6,114,623 | A | 9/2000 | Bonilla et al. |
| 6,175,078 | B1 | 1/2001 | Bambardekar et al. |
| 6,307,152 | B1 | 10/2001 | Bonilla et al. |
| 6,353,180 | B1 | 3/2002 | DeBartolo, Jr. et al. |
| 6,462,277 | B1 | 10/2002 | Young et al. |
| 6,483,028 | B1 | 11/2002 | DeBartolo, Jr. et al. |
| 6,545,215 | B1 | 4/2003 | Young et al. |
| 6,612,081 | B1 | 9/2003 | Cole et al. |
| 6,750,395 | B1 | 6/2004 | Stout et al. |
| 6,854,226 | B1 | 2/2005 | Cole et al. |
| 2002/0116883 | A1 | 8/2002 | Cole et al. |
| 2004/0099429 | A1 | 5/2004 | Castellani et al. |
| 2005/0126809 | A1* | 6/2005 | Drane et al. ............ 174/48 |
| 2005/0133235 | A1 | 6/2005 | Cole |

FOREIGN PATENT DOCUMENTS

| | | |
|---|---|---|
| DE | 1 105 939 | 5/1961 |
| FR | 1116385 | 5/1956 |
| GB | 836564 | 6/1960 |

OTHER PUBLICATIONS

Raceway Components Brochure entitled "Flush Poke-Thru"; dated Oct. 1991, no date.
Hubbell Brochure entitled "Fire-Rated Poke-Through Flush Furniture Feed"; dated 1992, no date.
Raceway Components Brochure entitled "Four On The Floor and More . . . The Flush Poke-Thru Doubles It's Capacity"; dated 1994, no date.
Walker Brochure for RC700 Series Flush Poke-Thru entitled "Place Power and Communication Services Where Needed"; dated 1997, no date.
Walker Brochure entitled "Walker RCI RC900 Series Quad Poke-Thru"; dated 1997, no date.
Walker Brochure for RC2001 Category 5 Flush Poke-Thru entitled "RC2001 Multiple Service Category 5 Flush Poke-Thru"; dated 1997, no date.
Hubbell Brochure entitled "Fire-Rated Poke-Throughs"; dated 1998, no date.
Walker Brochure entitled "RC3 Series Multiple Service Category 5 and Fiber Optic Flush Poke-Thru"; dated 1998, no date.
Walker Brochure entitled "Flush Floor Box Series Covers For Use With Walker 880 Series Round Floor Boxes"; dated 1998, no date.
Wiremold Brochure entitled "Walker RCI Poke-Thrus"; dated 1999.

* cited by examiner

SPRING-ACTIVATED IN-FLOOR FITTING

RELATED APPLICATIONS

This application is related to, and claims priority from, Provisional Application No. 60/532,188, filed Dec. 23, 2003, titled "Spring-Activated In-Floor Fitting," the complete subject matter of which is incorporated herein by reference in its entirety.

BACKGROUND OF THE INVENTION

The present invention generally relates to an in-floor fitting for carrying electrical equipment in the floors of buildings. More particularly, the present invention relates to spring-activated in-floor fitting that "pops up" out of the floor to receive a cable plug.

In-floor fittings such as poke-thru fittings, afterset fittings, and preset fittings are installed in concrete floors to provide electrical receptacles and communication/data receptacles (or jacks) at desired locations in buildings. Poke-thru fittings are designed to be installed in an opening in a floor, such as a concrete slab or steel deck, in a building structure such as an office building to provide electrical receptacles and/or communication/data receptacles at desired locations in buildings. As explained in U.S. Pat. No. 4,770,643, source power and signal cables, loosely positioned in a plenum, which is between the ceiling of the floor below and the floor above (that is, the floor in which the opening is in), may be pulled from the plenum and connected with or passed through the poke-thru fitting for activation of services for and on the floor above. More specifically, high voltage source power cables are connected with power receptacles that may be mounted within the poke-thru fitting or surface mounted on the floor above the fitting. Lower voltage communication/data signal cables have traditionally been passed through the poke-thru fitting to provide above floor connections between these cables and equipment positioned on the floor above. More recently, poke-thru fittings have been developed that also provide for mounting the communication/data receptacle within the fitting.

Standards promulgated by Underwriters Laboratories (UL) require poke-thru fittings to enable the fire rating of the floor to be substantially the same with or without the floor opening and fitting therein. As a result, poke-thru fittings typically incorporate fire-retarding material, generally intumescent material, to retard the transmission of heat and flame from a fire in the plenum, for example. The intumescent material is activated upon exposure to heat and flames, rising through the floor opening from a fire below the floor. The intumescent material absorbs the heat and expands to fill open spaces in the floor.

Components of many in-floor fittings upwardly protrude above the surface of the floor. Typical "monument-style" fittings include an upper housing that is positioned above the surface of the floor. Even when the fitting is not in use, the upper housing upwardly protrudes from the surface of the floor. Such protrusions may be aesthetically unpleasant and may also pose tripping hazards.

Thus, a need exists for a poke-thru assembly that addresses the problems described above.

BRIEF SUMMARY OF THE INVENTION

Certain embodiments of the present invention include an in-floor fitting. The in-floor fitting includes a trim ring and an internal housing. The internal housing includes at least one of an electrical and communication receptacle and is configured to be positioned in an open position in which the at least one of an electrical and communication receptacle is positioned above a surface of a floor, and a closed position is positioned in which the at least one of an electrical and communication receptacle is positioned below a surface of the floor.

Certain embodiments of the present invention include an in-floor fitting. The in-floor fitting includes a trim ring having a release tab mounted thereto and an internal housing having first and second locking grooves and at least one of an electrical and communication receptacle. The internal housing is configured to be moved from a closed position in which the release tab releasably engages the first groove and the at least one of an electrical and communication receptacle is positioned below a surface of a floor to an open position in which the release tab releasably engages the second groove and the at least one of an electrical and communication receptacle is positioned above the surface of the floor.

Certain embodiments of the present invention include an in-floor fitting. The in-floor fitting includes a trim ring having a release tab mounted thereto, an intumescent insert receiving at least one biasing member, and an internal housing including first and second locking grooves and at least one of an electrical and communication receptacle. The internal housing is configured to engage the biasing member such that the biasing member moves the internal housing from a closed position in which the release tab releasably engages the first groove and the at least one of an electrical and communication receptacle is positioned below a surface of a floor to an open position in which the release tab releasably engages the second groove and the at least one of an electrical and communication receptacle is positioned above the surface of the floor.

DETAILED DESCRIPTION OF THE INVENTION

Figure 1:
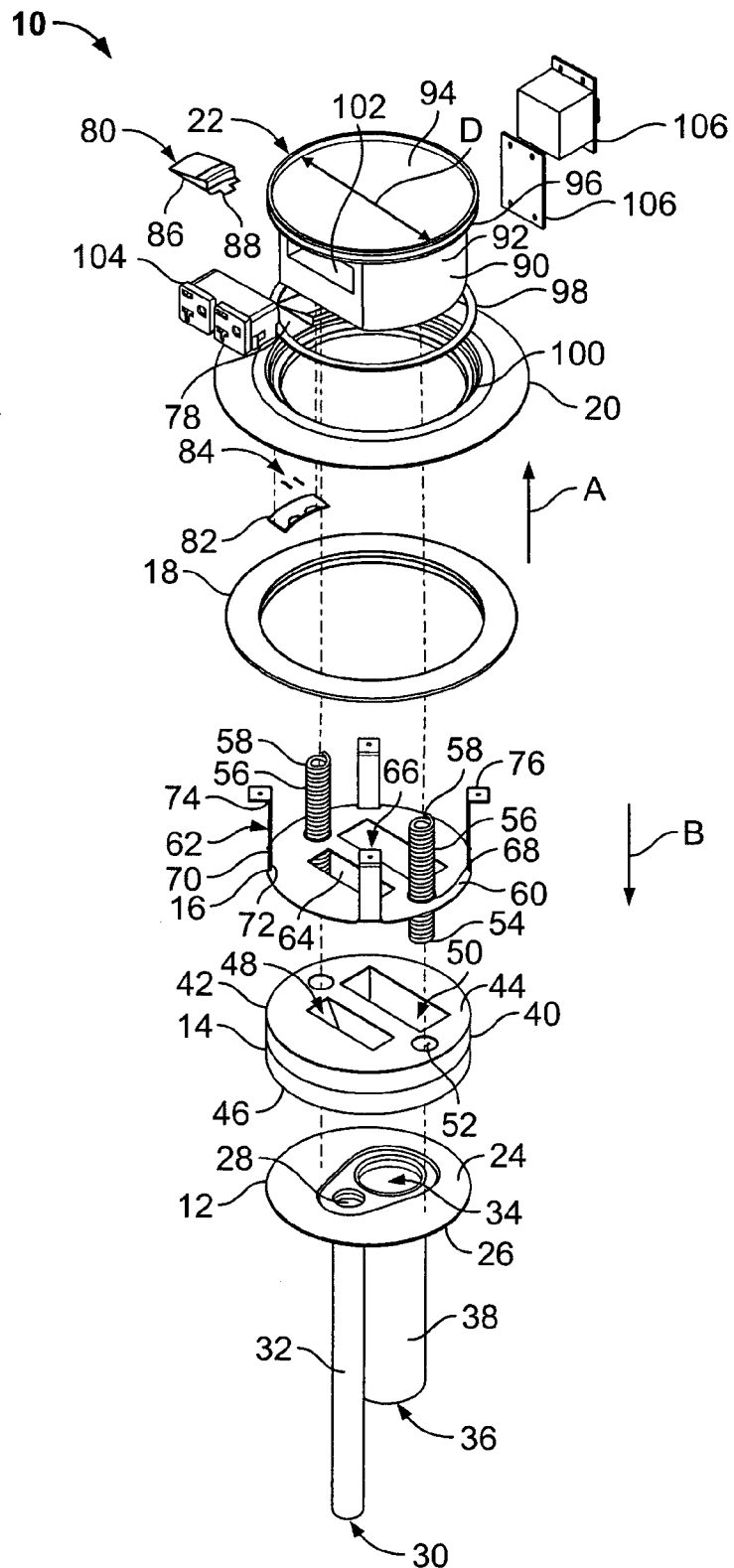
FIG. 1 illustrates an isometric exploded view of a poke-thru assembly according to an embodiment of the present invention.

FIG. 1 illustrates an isometric exploded view of a poke-thru assembly 10 according to an embodiment of the present invention. The assembly 10 includes a bottom plate 12, an intumescent insert 14, a top plate 16, an external gasket 18, a trim ring 20, an internal gasket 98, and an internal housing 22.

The bottom plate 12 includes an upper surface 24 and a lower surface 26. An electrical opening 28 is formed through the bottom plate 12, from the upper surface 24 through the lower surface 26 and into a channel 30 defined by a cylindrical electrical conduit 32. A communication opening 34 is formed from the upper surface 24 through the lower surface 26 and into a channel 36 defined by a cylindrical communication conduit 38.

The intumescent insert 14 includes a generally cylindrical main body 40 defined by an outer wall 42 and upper and lower surfaces 44, 46. An electrical opening 48 and a communication opening 50 extend from the upper surface 44 to the lower surface 46. Spring retaining divots 52 are also formed through the upper surface 44. The spring retaining divots 52 may extend all the way through the intumescent insert 14, or may extend from the upper surface 44, to a point within the main body 40. The spring retaining divots 52 are configured to receive and retain first end portions 54 of biasing members or springs 56. The springs 56 also include second end portions 58 configured to engage a bottom surface of the internal housing 22.

The top plate 16 includes a generally circular main body 60 with legs 62 extending upwardly therefrom. The main body 60 includes an electrical opening 64 and a communication opening 66 formed therethrough. Additionally, the main body includes spring passages 68 that allow the springs 56 to pass therethrough.

Each upwardly extending leg 62 includes an upright portion 70 having a first end 72 secured to the main body 60 of the top plate 16 and a second end 74 having a mounting tab 76. The mounting tabs 76 are configured to be secured to the trim ring 20. The trim ring 20 may be secured to the mounting tabs 76 through screws, nails, rivets, and the like. Alternatively, the trim ring 20 may include latching members, clasps, barbs, or the like that are configured to securably engage reciprocal structures formed on the mounting tabs 76.

The intumescent insert 14 is configured to be sandwiched between the bottom plate 12 and the top plate 16. When the assembly 10 is fully assembled, electrical wiring passes through an electrical passage defined by the electrical openings 64, 48, 28, and the channel 30. Similarly, communication/data cables pass through a communication passage defined by the communication openings 66, 50, 34 and the channel 36.

The external gasket 18 is configured to be sandwiched between the trim ring 20, and an upper surface of a floor (not shown). The trim ring 20 also includes a channel 78 configured to slidably retain a release tab 80. The release tab 80 is slidably retained within the channel 78 by way of a bottom plate 82 and springs 84, which act to bias the release tab 80 into an engaged position with respect to the internal housing 22. The release tab 80 includes an outer engagement portion 86 and a housing engaging prong 88. A user may move the release tab 80 away from the internal housing 22 by engaging the outer engagement portion 86. For example, a user may press down and/or back on the outer engagement portion 86 in order to move the release tab 80.

The internal housing 22 includes a main body 90 having an interior portion 92 and an upper surface 94. The diameter D of the upper surface 94 is greater than the diameter of an axial cross-section of the interior portion 92. An electrical chamber 102 and a communication chamber (not shown) are formed within the interior portion 92 and are configured to receive and retain an electrical receptacle 104 and a communication receptacle 106, respectively. The communication receptacle 106 is configured to receive and retain a communications device (such as a telephone, data, audio/visual connector, jack or device). A lip 96 is formed between the upper surface 94 and the interior portion 92. The lip 96 is configured sandwich an interior gasket 98 between a lower surface of the lip 96 and a recessed annular portion 100 of the trim ring 20. Thus, when the internal housing 22 is in a closed position, the upper surface 94 is flush, or substantially flush, with the upper surface of the trim ring 20 and/or the surface of the floor. As mentioned above, the second end portions 58 of the springs 56 are biased against a lower surface of the internal housing 22. The springs 56 exert a force into the internal housing 22 in the direction of A. At the same time, the springs 56 exert a force into the spring retaining divots 52 in the direction of B. The trim ring 20, the external gasket 18, and the internal gasket 98 include central openings through which the interior portion 92 of the internal housing 22 may move in the directions of A and B.

Figure 2:
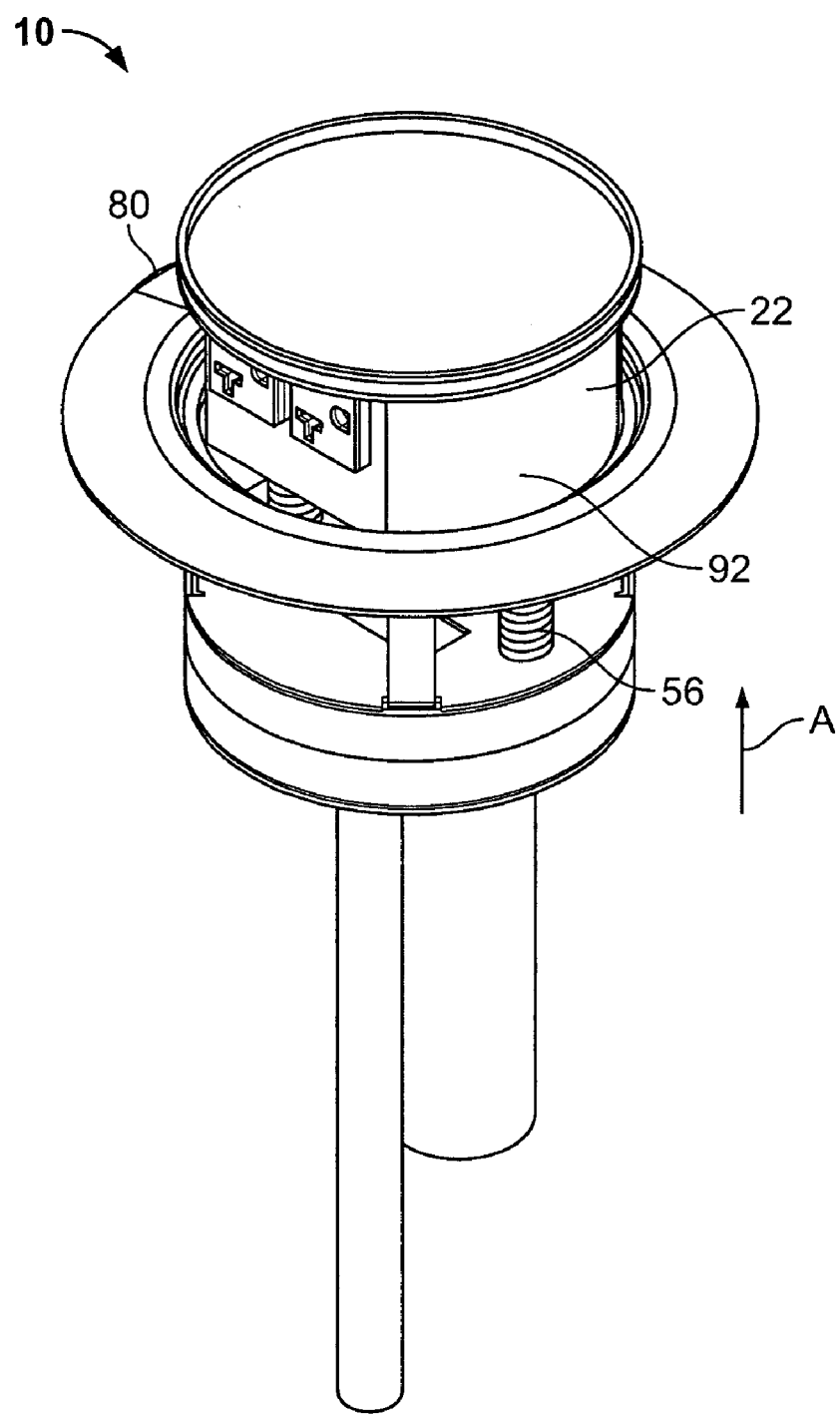
FIG. 2 illustrates an isometric view of the poke-thru assembly of FIG. 1 with the internal housing in an open position.

FIG. 2 illustrates an isometric view of a poke-thru assembly 10 with the internal housing 22 in an open position. The springs 56 exert a force into the lower surface of the internal housing 22 in the direction of A, thereby upwardly pushing the internal housing 22 into an open position. The internal housing 22 is retained in the open position by way of the housing engaging prong 88 (FIG. 1) of the release tab 80 engaging a reciprocal structure formed on the interior portion 92 of the internal housing 22.

Figure 3:
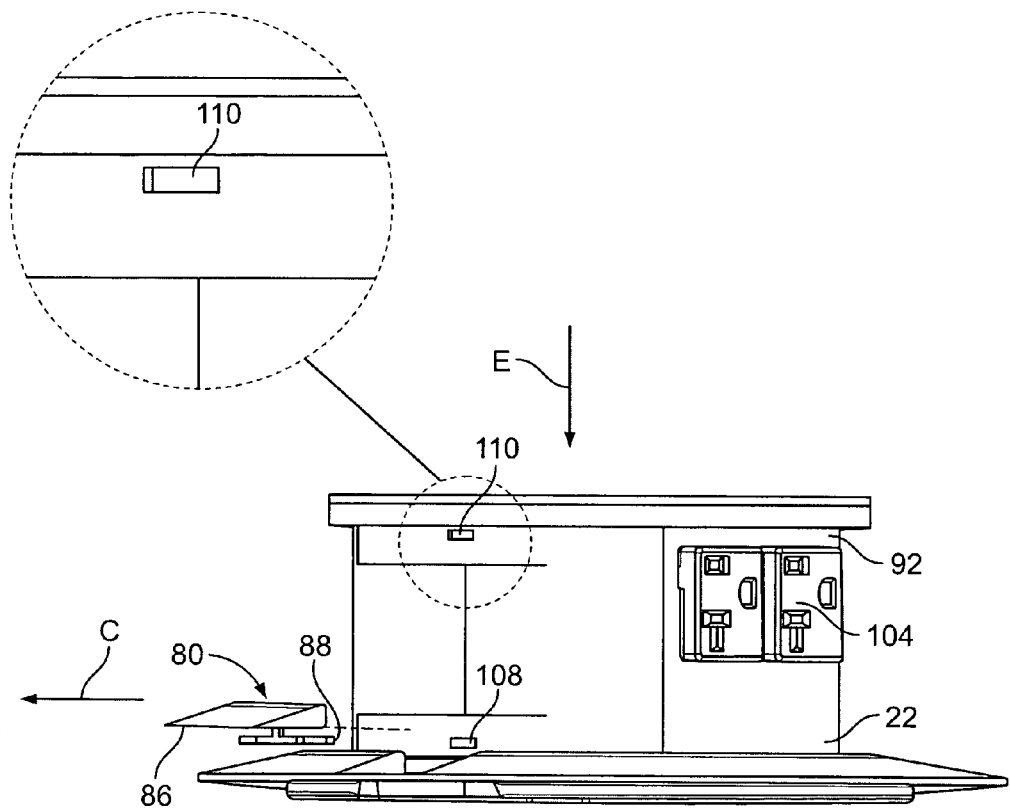
FIG. 3 illustrates an isometric, partially exploded view of the internal housing of FIG. 1 in an open position.

FIG. 3 illustrates an isometric, partially exploded view of the internal housing 22 in an open position. The internal housing 22 includes locking grooves 108 and 110 formed thereon. For example, the locking groove 108 is configured to retain the internal housing 22 in an open position, while the locking groove 110 is configured to retain the internal housing 22 in a closed position. The locking grooves 108 and 110 are engaged by the housing engaging prong 88 of the release tab 80. That is, the internal housing 22 is held in an open or closed position by way of the housing engaging prong 88 being positioned within the grooves 108 or 110.

In order to close the internal housing 22, the release tab 80 is urged back from the internal housing 22 in the direction of C. As the release tab 80 is urged away from the internal housing 22, the housing engaging prong 88 is removed from the groove 108. Once the housing engaging prong 88 is removed from the groove 108, the internal housing 22 is pushed downwardly in the direction of E. Then, the release tab 80 is released and is biased against the outer surface of the interior portion 92 (by way of the springs 84 (FIG. 1)). As the internal housing 22 is pushed downwardly in the direction of E, the groove 110 comes into contact with the housing engaging prong 88. The housing engaging prong 88 is biased into the groove 110, thereby maintaining the internal housing 22 in a closed position.

In order to expose the internal housing 22 in an open position, the release tab 80 is urged away from the internal housing 22 in the direction of C so that the housing engaging prong 88 disengages from the groove 110. The springs 56 (FIG. 2) push the internal housing 22 in an upward direction until the housing engaging prong 88 engages the groove 108, thereby holding the internal housing 22 in an open position.

Thus, when the electrical receptacle 104 and/or the communication receptacle 106 (FIG. 1) are in use, the internal housing 22 is in a "popped-up" or open position to expose the receptacles 104 and 106. When the receptacles 104 and 106 are not in use, the internal housing 22 is closed such that the upper surface 94 (FIG. 1) is substantially flush with a surface of the floor.

Figure 4:
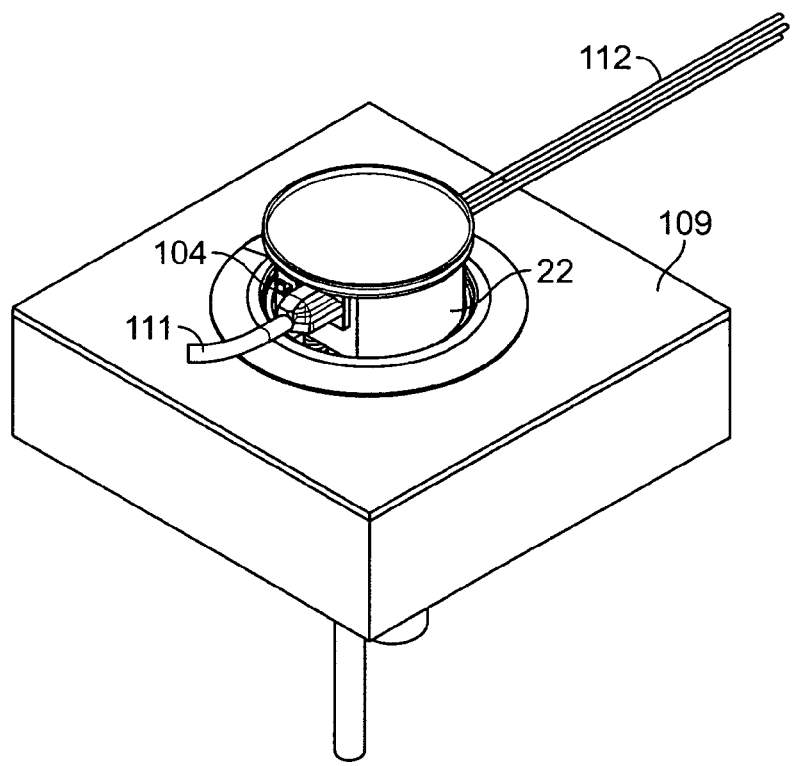
FIG. 4 illustrates an isometric view of the internal housing of FIG. 1 in an open position.

FIG. 4 illustrates the internal housing 22 in an open position. The internal housing 22 is above the surface of the floor 109. A power cable 111 is operatively connected to the electrical receptacle 104, while data cables 112 are operatively connected to the communication receptacle 106 (FIG. 1).

Figure 5:
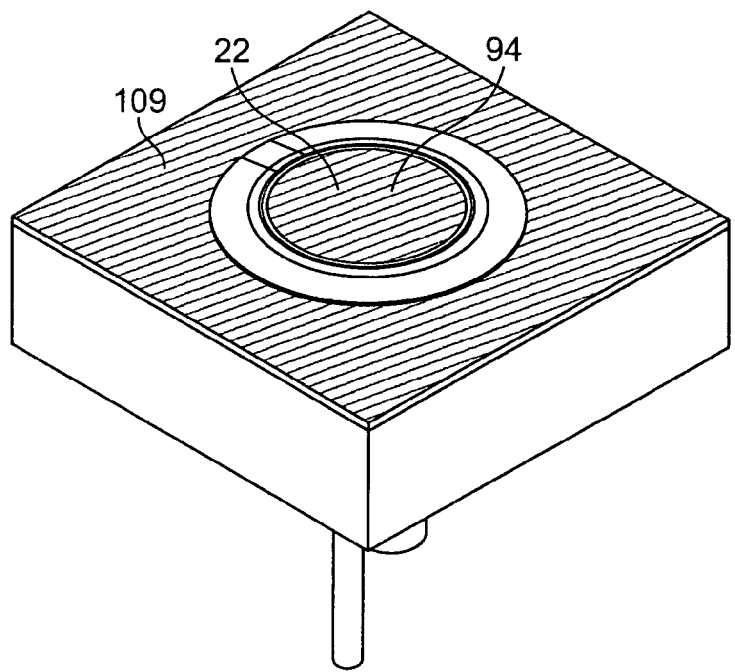
FIG. 5 illustrates the internal housing of FIG. 1 in a closed position.

FIG. 5 illustrates the internal housing 22 in a closed position. As shown in FIG. 5, the upper surface 94 of the internal housing 22 is substantially flush with the surface of the floor 109.

The internal housing 22 may include a cupped, or recessed, top surface that allows for an insert that matches the floor covering. For example, the cupped top surface may include latching members that securably engage reciprocal structures located on the underside of a floor insert that is configured to be received and retained by the cupped top surface. Thus, the assembly 10 may blend in with the finished floor.

Embodiments of the present invention may be used with various types of in-floor fittings, including poke-thru, after-set and preset fittings. The fitting assembly 10 may be constructed to be water-tight, as disclosed in U.S. Pat. No. 6,612,081, entitled "Water Tight Cover Assembly for an In-Floor Fitting," which is hereby incorporated by reference in its entirety.

Further, while the fitting assembly 10 is shown having a circular cross-section, various other shapes may be incorporated. Additionally, more or less than two springs 56 may be used. For example, a larger spring having a suitable for constant (k) may be used in place of the two springs 56. The single spring may be positioned through the center of the top plate 16, for example. Further, the internal housing 22 may be configured to receive and retain more or less than the electrical receptacle 104 and the communication receptacle 106. For example, the internal housing 22 may be configured to house two electrical receptacles 104 or two communication receptacles 106. The internal housing 22 may include cavities configured to receive and interchangeably retain different types of receptacles. Thus, the assembly 10 may be adapted to changing power and communication requirements.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. An in-floor fitting, comprising:
a trim ring; and
an internal housing, said internal housing comprising at least one of an electrical and communication receptacle, said internal housing being configured to engage said trim ring such that said internal housing is positioned in an open position in which said at least one of an electrical and communication receptacle is positioned above a surface of a floor, and a closed position in which said at least one of an electrical and communication receptacle is positioned below said surface of said floor.

2. The in-floor fitting of claim 1, further comprising spring members, said spring members exerting a force against said internal housing to urge said internal housing into an open position.

3. The in-floor fitting of claim 2, further comprising a release tab slidably retained within a channel of said trim ring, and wherein said internal housing further comprises grooves that are engages by said release tab to retain said internal housing in said open and closed positions.

4. The in-floor fitting of claim 1, wherein an upper surface of said internal housing is cupped and configured to receive and retain a flooring insert.

5. The in-floor fitting of claim 1, wherein said at least one of an electrical and communication receptacle comprises a plurality of electrical receptacles.

6. The in-floor fitting of claim 1, wherein said at least one of an electrical and communication receptacle comprises a plurality of communications receptacles.

7. The in-floor fitting of claim 1, further comprising a water-tight cover.

8. The in-floor fitting of claim 1, further comprising an intumescent insert.

9. An in-floor fitting, comprising:
a trim ring including a release tab mounted thereto; and
an internal housing comprising first and second grooves and at least one of an electrical and communication receptacle, said internal housing being configured to be moved from a closed position in which said release tab releasably engages said first groove and said at least one of an electrical and communication receptacle is positioned below a surface of a floor to an open position in which said release tab releasably engages said second groove and said at least one of an electrical and communication receptacle is positioned above said surface of said floor.

10. The in-floor fitting of claim 9, further comprising at least one spring member, said at least one spring member exerting a force against said internal housing to urge said internal housing from said closed position to said open position.

11. The in-floor fitting of claim 9, wherein said trim ring includes a channel, said channel slidably receiving said release tab such that said release tab may be moved relative to said internal housing within said channel to release said internal housing from said open and closed positions.

12. The in-floor fitting of claim 9, wherein said internal housing includes an upper surface, said upper surface being cupped and configured to receive and retain a flooring insert and that is substantially flush with said surface of said floor when said internal housing is in said closed position.

13. The in-floor fitting of claim 9, further comprising an intumescent insert.

14. The in-floor fitting of claim 9, wherein said release tab is moved out of said first groove such that said internal housing moves from said closed position toward said open position, said release tab moving into said second groove as said internal housing moves toward said open position to retain said internal housing in said open position.

15. The in-floor fitting of claim 9, wherein said release tab is moved out of said second groove when said internal housing is moved from said open position toward said closed position, said release tab moving into said first groove as said internal housing moves toward said closed position to retain said internal housing in said closed position.

16. An in-floor fitting, comprising:
a trim ring including a release tab mounted thereto;
an intumescent insert receiving at least one biasing member; and
an internal housing comprising first and second locking grooves and at least one of an electrical and communication receptacle, said internal housing being configured to engage said biasing member such that said biasing member moves said internal housing from a closed position in which said release tab releasably engages said first groove and said at least one of an electrical and communication receptacle is positioned below a surface of a floor to an open position in which said release tab releasably engages said second groove and said at least one of an electrical and communication receptacle is positioned above said surface of said floor.

17. The in-floor fitting of claim 16, wherein when said internal housing includes an upper surface and when said internal housing is in said closed position, said upper surface is substantially flush with said surface of said floor.

18. The in-floor fitting of claim 16, wherein said biasing member is a spring.

19. The in-floor fitting of claim 16, wherein said trim ring includes a channel, said channel slidably receiving said release tab such that said release tab may be moved relative to said internal housing within said channel to release said internal housing from said open and closed positions.

20. The in-floor fitting of claim 16, wherein an audio/video (AV) connector is operatively connected to said at least one of an electrical and communication receptacle when said internal housing is in said open position.

* * * * *